United States Patent
Ikeshiro (10) Patent No.: US 7,344,106 B2
(45) Date of Patent: Mar. 18, 2008

(54) VERTICAL TAKE-OFF AND LANDING AIRCRAFT

(76) Inventor: Tatsuo Ikeshiro, 18-8-208, Hachiman 7-chome, Aoka-ku, Sendai-shi, Miyagi (JP) 980-0871

( * ) Notice: Subject to any disclaimer, the term of this patent is extended or adjusted under 35 U.S.C. 154(b) by 0 days.

(21) Appl. No.: 11/380,539

(22) Filed: Apr. 27, 2006

(65) Prior Publication Data

US 2007/0034733 A1 Feb. 15, 2007

Related U.S. Application Data (63) Continuation of application No. PCT/JP03/13735, filed on Oct. 27, 2003.

(51) Int. Cl.
*B64C 39/00* (2006.01)
(52) U.S. Cl. .......... 244/17.11; 244/19; 244/21
(58) Field of Classification Search .......... 244/21, 244/22, 10, 11, 19, 12.4, 12.5
See application file for complete search history.

(56) References Cited

U.S. PATENT DOCUMENTS

| | | |
|---|---|---|
| 1,839,556 A | 1/1932 | Henry |
| 4,113,205 A | 9/1978 | Shaw |
| 5,720,453 A * | 2/1998 | Platt .......................... 244/23 D |
| 6,382,560 B1 * | 5/2002 | Ow ........................... 244/23 C |
| 6,648,270 B1 * | 11/2003 | Burnett et al. ............. 244/23 A |
| 6,843,447 B2 * | 1/2005 | Morgan ...................... 244/12.3 |
| 6,860,449 B1 * | 3/2005 | Chen .......................... 244/12.1 |
| 6,892,980 B2 * | 5/2005 | Kawai ........................ 244/12.4 |

FOREIGN PATENT DOCUMENTS

| | | |
|---|---|---|
| DE | 2726386 A1 | 12/1977 |
| FR | 867442 A | 10/1941 |
| GB | 1 566 276 | 4/1980 |
| JP | 52-041400 | 3/1977 |
| JP | 53-27997 A | 3/1978 |
| JP | 57-160797 A | 10/1982 |
| JP | 07-267192 | 10/1995 |
| WO | 79/00945 A1 | 11/1979 |

* cited by examiner

*Primary Examiner*—Timothy D. Collins
(74) *Attorney, Agent, or Firm*—Ronald E. Smith; Smith & Hopen, P.A.

(57) ABSTRACT

A vertical take-off and landing aircraft has an airframe body that defines a loop-shaped path of travel for a plurality of movably-mounted wings that are transversely disposed relative to a longitudinal axis of the aircraft. The airframe body has two side frames that are transversely spaced apart in parallel relation to one another and interconnected by a pair of fixed wings that do not follow the path of travel of the movably-mounted wings. A passenger compartment is positioned between the two side frames and within the loop traveled by the movably mounted wings.

4 Claims, 13 Drawing Sheets

VERTICAL TAKE-OFF AND LANDING AIRCRAFT

BACKGROUND OF THE INVENTION

1. Field of the Invention

The present invention relates to an airplane that no runway is necessary and it can vertical takeoff and landing on the land, the water and the snow and characterized in a method of generating lift.

2. Background Art

Since a current jet plane generates lift by accelerating propulsion power of a very long wing, it requires very large propulsion power and is accompanied with an economic loss, increase of a cost for complete equipment.

A horizontally long wing occupies surplus area other than minimum utilization for passenger and freight and requires a large hanger, and thus it cannot be a familiar transportation.

Since a jet plane requires an airfield with a long runway and noise pollution of a high power engine, it requires a vast place in an inconvenient remote area and needs to construct terminal buildings. It also requires a wasteful expense and time to go to and from place and incidental facilities investment for transportation such as buses and trains.

Although the jet plane is suitable for a long-distance trip to foreign countries and characterized in its high speed and mass transport, since it cannot make small turn, it is not adequate to transportation for domestic, short distance.

A helicopter can vertical takeoff and landing, however, a large hangar is required because of its very long rotor.

Takeoff and landing on a residential area is difficult and the spread to the public is limited because of the noise of a high power engine.

Car-oriented society has approached the limits as follows.

A. Increase of car accidents and a bodily injury and generation of a traffic jam caused by cross moving on the same plane (road).

B. Social and human cost, economic loss and strong pressure of mental strain caused by frequency of accidents.

C. Uneven distribution and waste of a huge financial investment such as a highway construction, a tunnel digging and signal equipment.

D. $CO_2$ emission, global warming and early coming of depletion of resources caused by mass consumption of fossil fuel.

E. Social anxiety of health hazard and larger burden of medical expenses caused by exhaust gas.

F. A traffic congestion caused by an accident of drowsy driving of trucks with unbroken tension in long-distance service.

G. An accident induced by a structural defect in opposite action of the right foot and instant judgment of a throttle and a brake.

H. Economic and social loss, storing of stress, etc. caused by a speed restriction and a traffic jam.

SUMMARY OF THE INVENTION

Problems to be solved are that the present invention is characterized by a method for generating lift, and since it can vertically takeoff and landing from a home garden and a building rooftop and does not scatter dust to a neighborhood, it can be active in every place such as desert, a skiing area and water surface. It is suitable for forest fire extinction because of its quick water absorption and for safety and quick escape guiding with respecting for human life if a road is destroyed in the brunt of the earthquake, and it has wide range of activity in personal, family and every industrial world as well as another competent authorities, and thus it can solve the problems which has approached limits in car- and airplane-oriented society of the twentieth century as a new trinity transportation system on the land, water surface and in the air.

Propulsion power and lift are not generated at near its center of a existing propeller but are generated at a peripheral part that cuts air in high speed. Consequently noise pollution is caused by amplification of noise of a high power engine and wind noise at ultra high-speed in confrontational wind speed at a propeller end. In the method for generating lift in the present invention, since whole wing of plural rotary wings is evenly rotated at a constant speed, whole surface of the wing and each wing independently can generate lift, and thus it does not disturb the neighborhood by noise pollution and the wind pressure as well as triggering the simultaneous action of lift and propulsion power.

Since, it provides simple body structure, low cost of body manufacturing, flight by a small power engine and a size of a little larger than a car, it does not require a surplus area other than utilization for passenger and freight like a long wing jet plane and a helicopter and a large hanger. Therefore, it can expect of the spread as a private plane for all over the world (developing countries and remote islands).

The axis is attached to the wing to be the rotary wing. The axis(axes) of plural rotary wings are rotated in the paths of both sides, and the wing generates a lift in moving upper forward of a path wall and attenuates the same in moving lower backward.

In this method, since lift is not generated by propulsion power like a jet plane but is generated by rotating wings in standstill on the land (or the water), propulsion for takeoff is conducted after airframe weighting becomes around zero, and thus it can almost vertically takeoff and landing without a runway.

Since lift is generated by the rotary wings at almost whole area of the airframe and the whole lower area of the airframe can be used for passenger and freight compartment, there are no long things such as a main wing of a jet plane and a rotor of a helicopter, and thus the area of the whole airframe dose not become large.

It can on-site response by reducing occupation area for passengers when it is always used in a small group and by coupling and building more same planes when it is used for mass transport.

In slow flight and taxiing, it can use front lift by entering the rotary wing having changed angle of approach into the path for moving forward lower in front of the main axis.

No runway is required and if the forward thereof is open, it can takeoff and landing from a home garden and a building rooftop, and thus it has promise as near future transportation of domestic and short distance.

The effect that the present invention brings to future society is great. Since it requires little investment expense for infrastructure improvement such as highway construction, tunnel digging and road incidental facilities, it does not require a very long runway like a current airport, a terminal building and transportation for access, it can eliminate a traffic jam, frequent accident, loss of access to an airport and noise pollution, and it is characterized by its small size, the method for generating lift and vertical takeoff and landing, "Wing Rotary" is a new future trinity transportation which can freely navigate on the land, the water and in the air.

Since whole upper area of the airframe is covered with wings, it can make a soft-landing safely in a crash due to machine fault. Thus, it can fly in peace and safely if rare accident happens.

It is suitable for forest fire extinction because of its quick water absorption after landing on the water. It can quick escape guiding with respecting for human life if a road is destroyed in the brunt of the earthquake.

It also suitable for takeoff and landing on the water, the snow and desert because it does not blow on the ground.

Since a cockpit and a entrance can be separated completely in a coupled plane, it cannot be hijacked, and thus it is safely operated. In the case of mass transport, there is the convenience of immediate on-site response by coupling and building more same planes.

DETAILED DESCRIPTION OF THE PREFERRED EMBODIMENT

Figure 1:
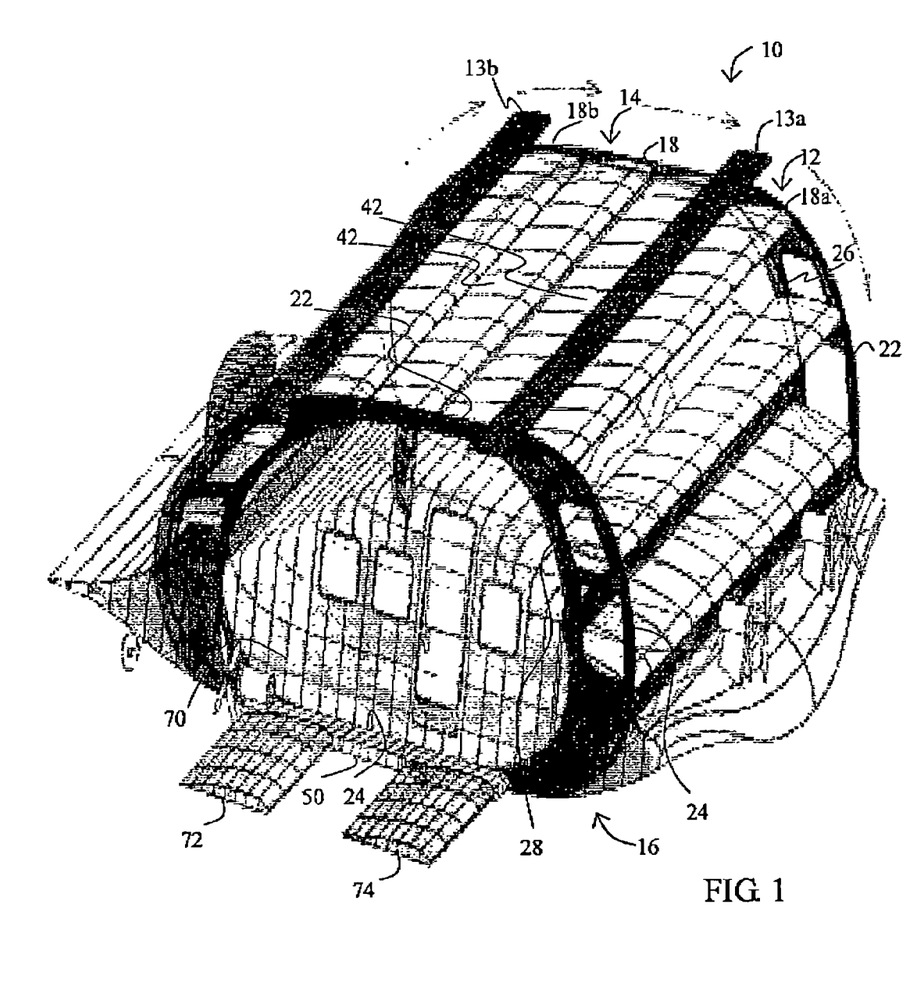
FIG. 1 is a front perspective view of an illustrative embodiment of the invention.
Figure 2:
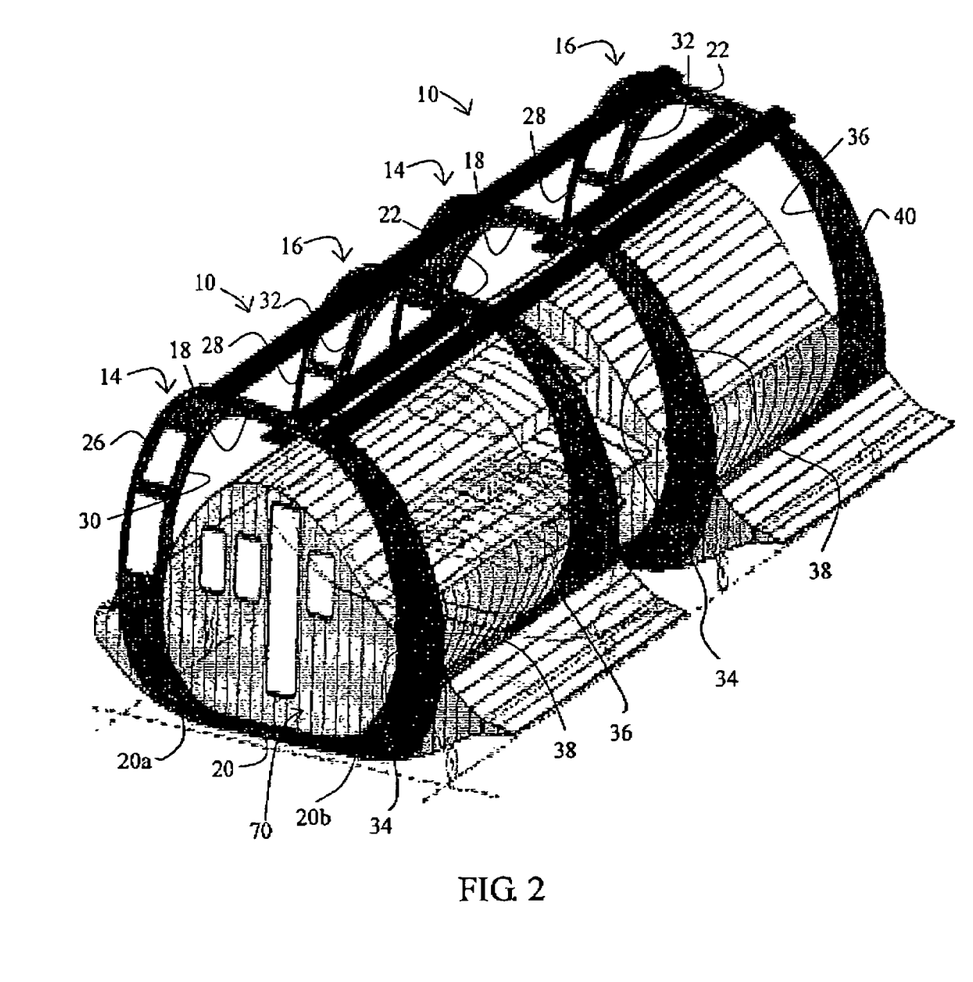
FIG. 2 is a perspective view depicting two of the novel aircraft coupled together, with the wings omitted to simplify the drawing.

Referring now to FIGS. 1 and 2, it will there be seen that the novel vertical take-off and landing aircraft is denoted as a whole by the reference numeral 10.

Figure 12:
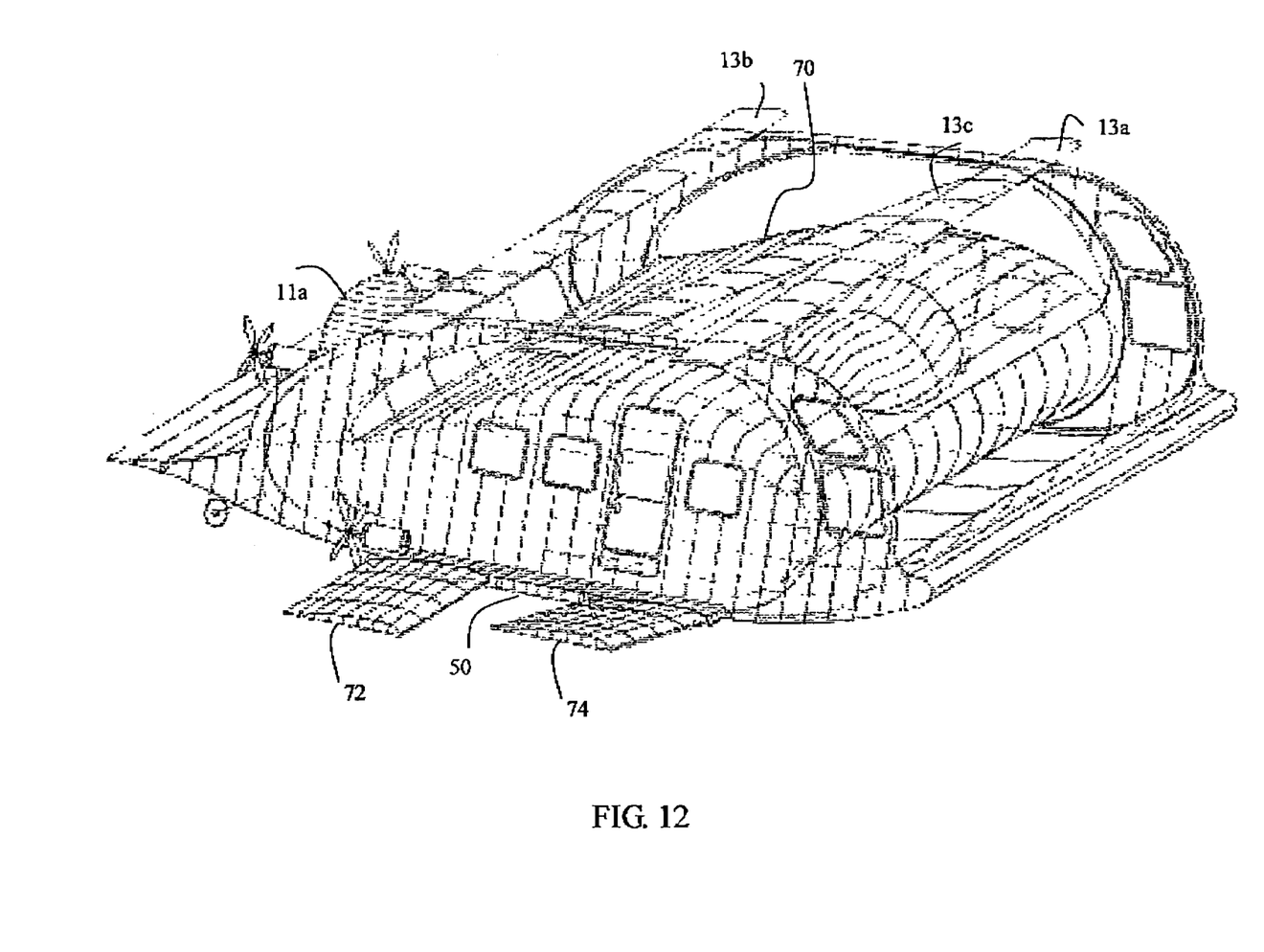
FIG. 12 is a perspective view depicting a front side wing and a fixed wing, said wings being in parallel with the ground when the aircraft is turning right.

It includes a rigid aircraft frame body 12 that includes a first frame 14 positioned on a first side of said aircraft, said first frame 14 being longitudinally disposed and vertically-oriented, and a second frame 16 positioned on a second side of said aircraft, said second frame being longitudinally disposed and vertically-oriented. Accordingly, the first and second frames are parallel to and transversely spaced apart from one another. First and second frames 14, 16 are interconnected by fixed wings 13a, 13b. As indicated in FIG. 12, there is also a fixed wing 13c that may be rolled (rotated about the longitudinal axis of the aircraft) as depicted for turning purposes.

First frame 14 includes a top horizontal cart 18 having a leading end 18a and a trailing end 18b, and a bottom horizontal part 20 having a leading end 20a and a trailing end 20b.

Second frame 16 includes a top horizontal part 22 having a leading end 22a and a trailing end 22b, and a bottom horizontal part 24 having a leading end 24a and a trailing end 24b.

Figure 5A:
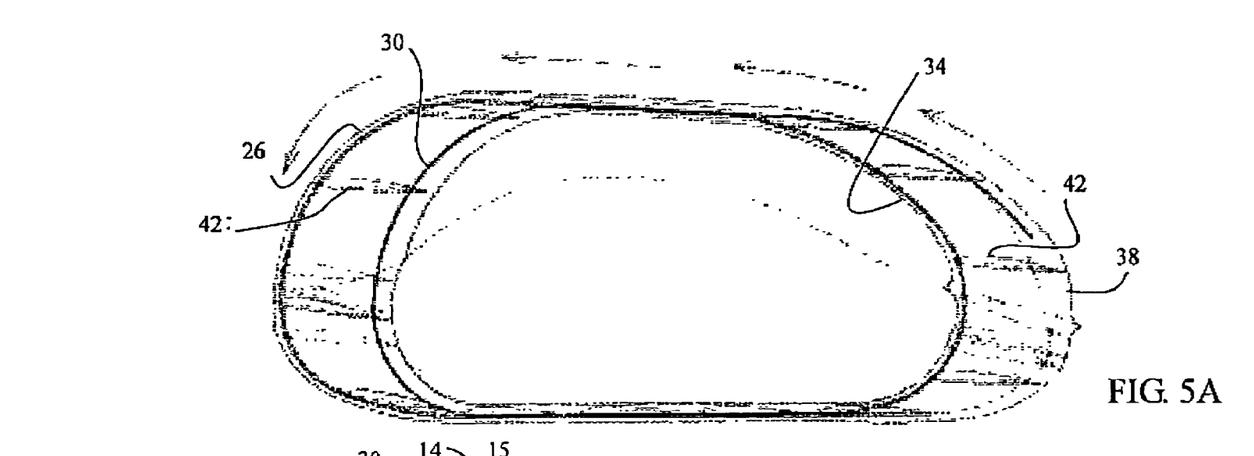
FIG. 5A is a side elevational view of the aircraft frame, depicting an embodiment where the wings remain horizontally disposed as they follow the loop-shaped path of travel about the aircraft frame.
Figure 5B:
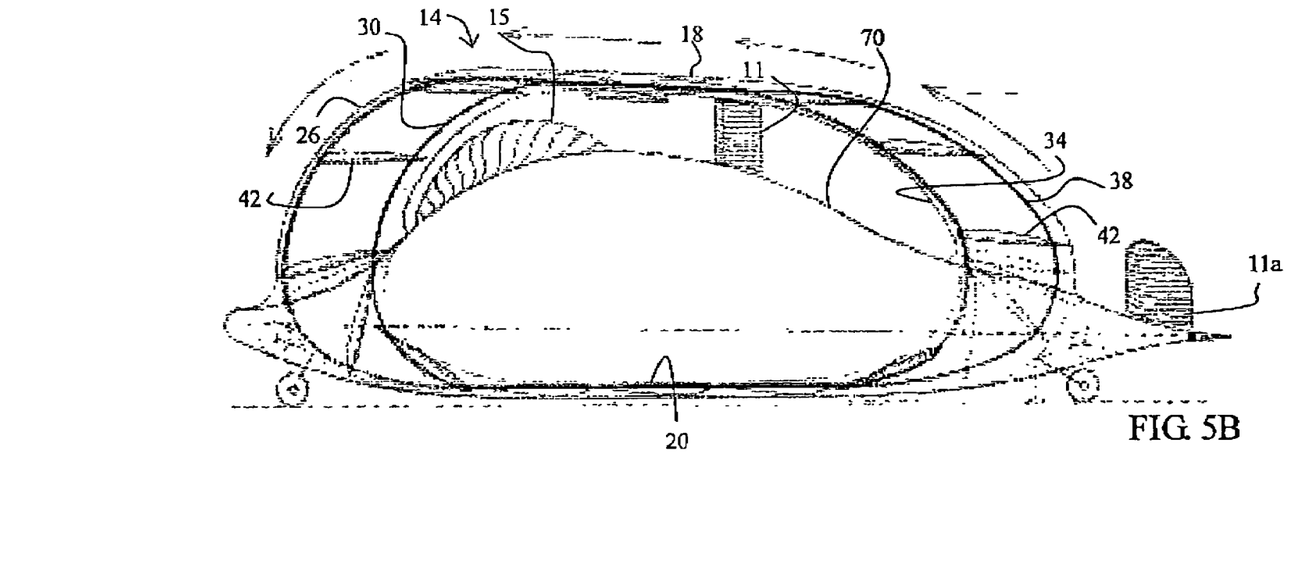
FIG. 5B is a side elevational view of the aircraft frame, depicting an embodiment where the wings fold into a closed configuration and unfold into a deployed configuration as they follow the loop-shaped path of travel about the aircraft frame.
Figure 6:
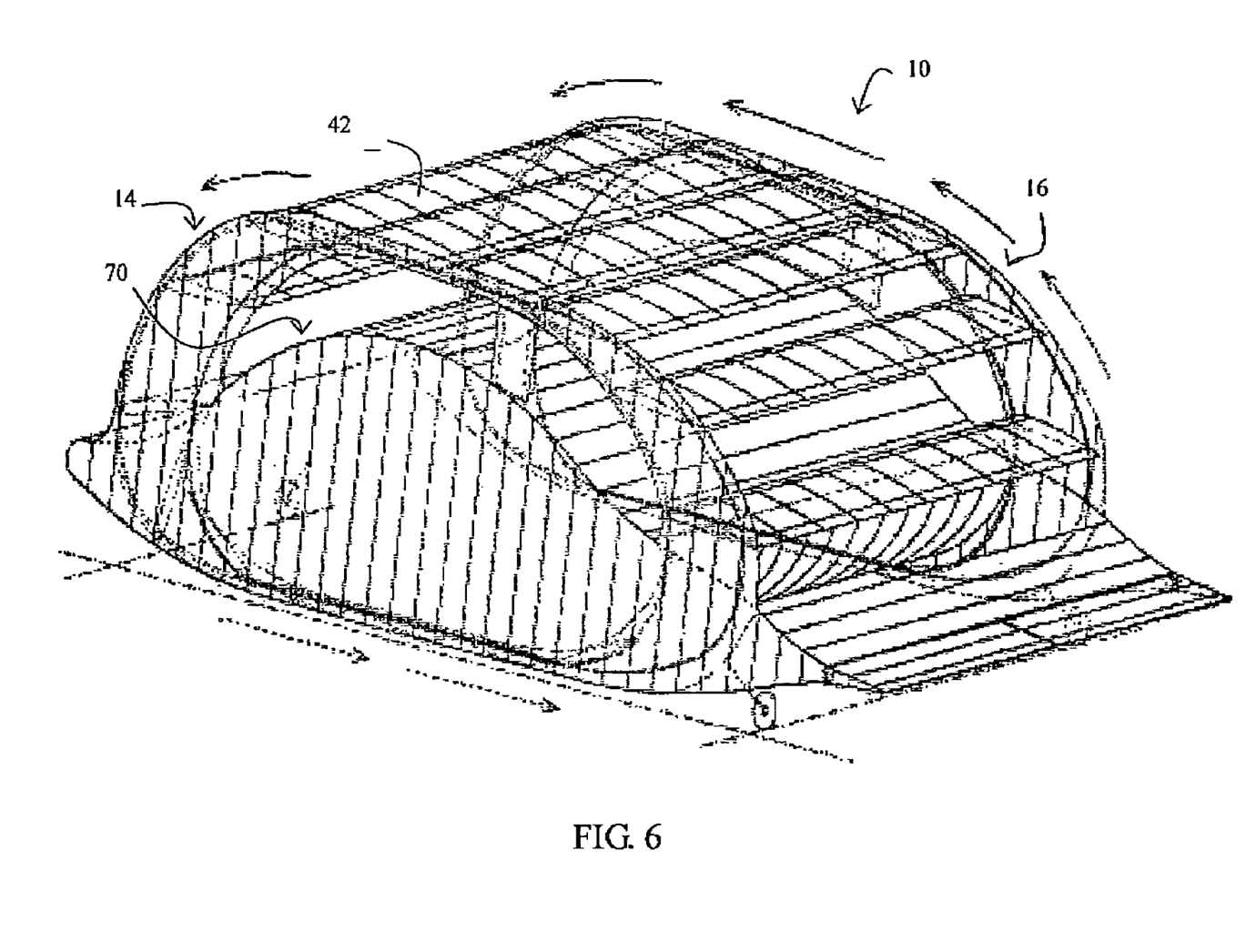
FIG. 6 is a rear perspective view of the novel aircraft.

As best understood by referring to FIGS. 1, 2, and 5, forward, leading arcuate parts 26, 28 interconnect the respective leading ends 18a, 22a of top horizontal parts 18, 22 to the respective leading ends 20a, 24a of bottom horizontal parts 20, 24.

Forward, trauma arcuate parts 30, 32 interconnect respective leading ends 18a, 20a of the horizontal top parts 18, 20 to respective leading ends 20a, 24a of bottom horizontal parts 20, 24.

Rearward, leading arcuate parts 34, 36 interconnect respective wailing ends 18b, 22b of said too horizontal parts 18, 22, and respective trailing ends 20b, 24b of said bottom horizontal parts 20, 24.

Rearward, trailing arcuate parts 38, 40 interconnect respective trailing ends 18b, 22b of said top horizontal parts 18, 22 and respective trailing ends 20b, 24b of bottom horizontal parts 20, 24.

A plurality of wings, collectively denoted 42, is disposed in interconnecting relation to said first and second frames 14 and 16. Each wing 42 is transversely disposed relative to a longitudinal axis of aircraft 10 and each wine 42 has a first end movably connected to first frame 14 and a second, transversely opposed second end movably connected to second frame 16.

Figure 3A:
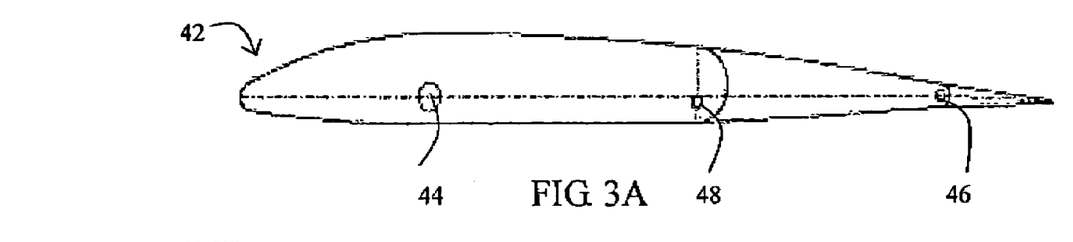
FIG. 3A is a cross-sectional view of a first embodiment of a wing of the novel aircraft.
Figure 3B:
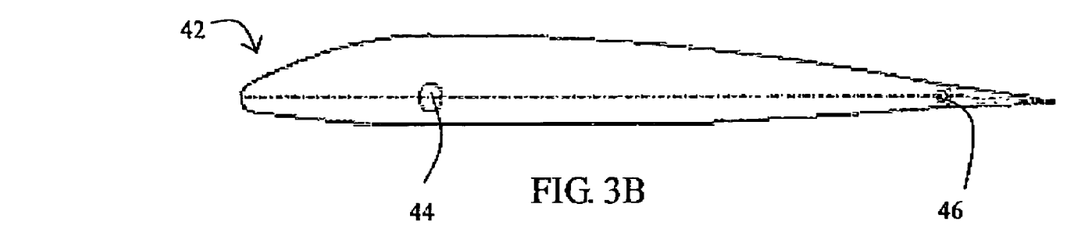
FIG. 3B is a cross-sectional view of a second embodiment of a wing of the novel aircraft.
Figure 3C:
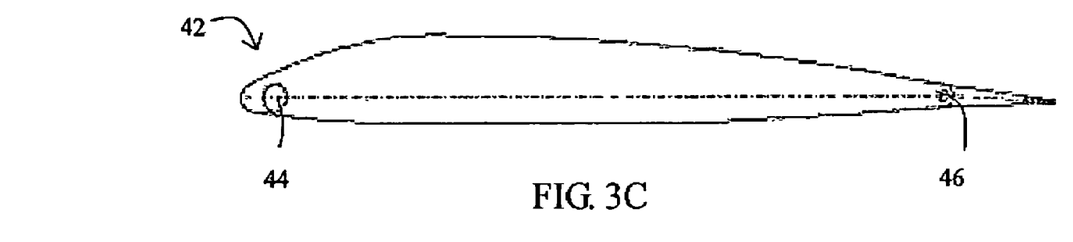
FIG. 3C is a cross-sectional view of a third embodiment of a wing of the novel aircraft.
Figure 3D:
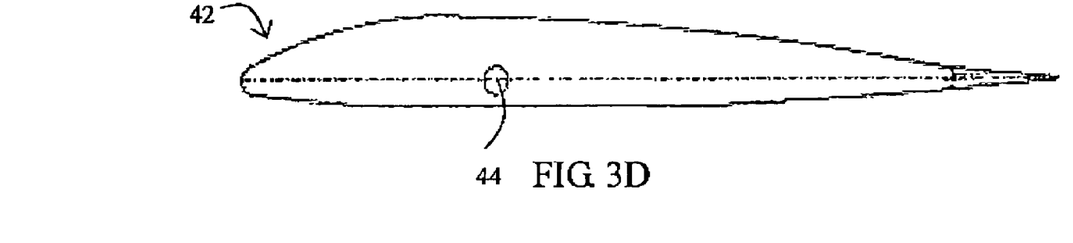
FIG. 3D is a cross-sectional view of a third embodiment of a wins of the novel aircraft.
Figures 4A, 4B:
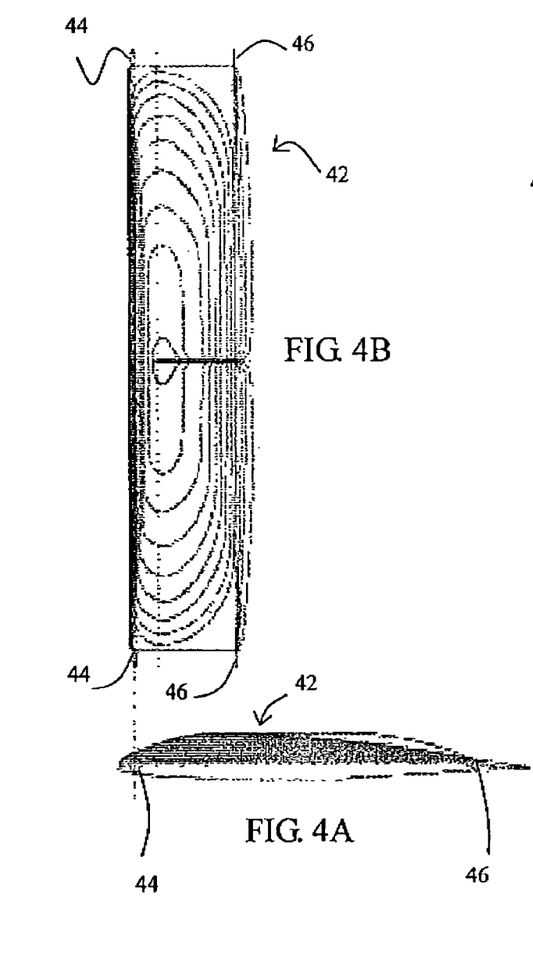
FIG. 4A is a cross-sectional view of a wing of the novel aircraft.
FIG. 4B is a top plan view of the wing depicted in FIG. 4A.
Figures 4C, 4D:
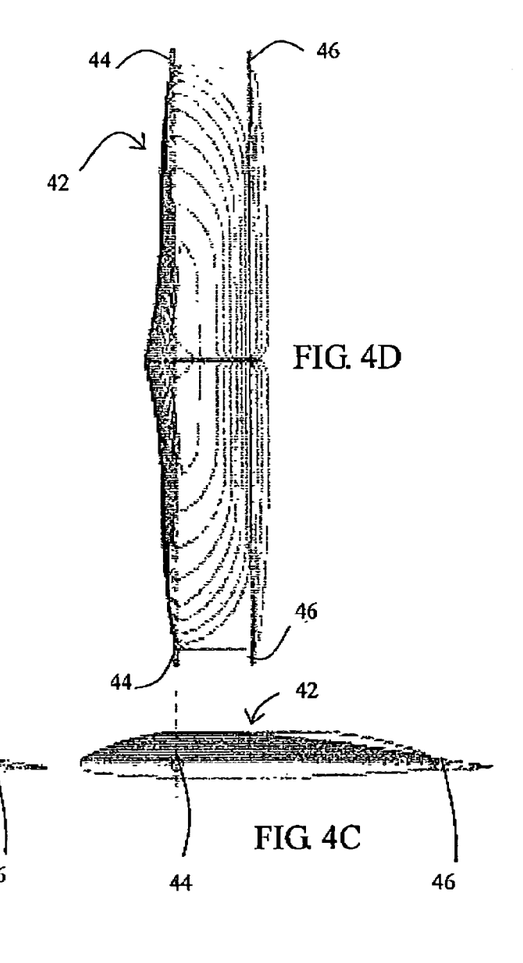
FIG. 4C is a cross-sectional view of a wing of the novel aircraft.
FIG. 4D is a top plan view of the wing depicted in FIG. 4D.

More particularly, each wing 42 has a leading end movably connected at its opposite ends to the first and second frames 14, 16 and a trailing end movably connected at its opposite ends to said first and second frames. As best understood in connection with FIG. 3A, a wing 42 may have a leading connector 44 that defines a main axis, a trailing connector 46 that defines an end axis, and a connector 48 that defines an intermediate axis. Each wing has an unillustrated connector on its opposite side that matches each illustrated connector. The connectors movably engage airframes 14, 16 so that the wings follow the loop-shaped path as indicated by directional arrows in FIGS. 1, 5A, 5B, 6, and 13A. Main axis 44 can be positioned in several different locations relative to the leading edge of the wing, as indicated in FIGS. 3B, 3C, and 3D. Moreover, the intermediate axis need not be used in all configurations as indicated by said figures.

The leading end of each wing 42 follows a loop-shaped path of travel that includes traversing said top horizontal parts 18, 22 from respective trailing ends 18b, 22b to respective leading ends 18a, 22a of said top horizontal parts, traversing said forward, leading arcuate parts 26, 28 from said leading ends 18a, 22a of said horizontal top parts to said respective leading ends 20a, 24a of said horizontal bottom parts, traversing said horizontal bottom parts from said respective leading ends 20a, 24a to their respective trailing ends 20b, 24b, and traversing said rearward, leading arcuate carts 34, 36 from said trailing ends of said bottom horizontal Parts 20, 24 to said respective trailing ends of said respective top horizontal parts 18b, 22b to complete one rotation.

The trailing end of each wing follows a loop-shaped path of travel that includes traversing said top horizontal parts 18, 22 from respective trailing ends 18b, 22b to respective leading ends 18a, 20a thereof, traversing said forward, trailing arcuate parts 30, 32 from said respective leading ends 18a, 22a of said horizontal top parts to said respective leading ends 20a, 24a of said horizontal bottom parts, traversing said bottom horizontal parts from said respective leading ends to their respective trailing ends 20b, 24b, and traversing said rearward, trailing arcuate parts 36, 38 from said respective trailing ends 20b, 24b of said bottom horizontal parts 20, 24 to said respective trailing ends 18b, 22b of said too horizontal parts 18, 20 to complete one rotation.

In the embodiment of FIG. 5A the wings remain in a substantially horizontal position as they follow their respective loop-shaped paths of travel.

In the embodiment of FIG. 5B, the wings fold as depicted, changing their respective approach angles, as they follow the path of travel defined by forward arcuate parts 26, 28, 30, 32 of the aircraft frame. They unfold or re-deploy as depicted as they follow the path of travel defined by rearward arcuate parts 34, 36, 38, 40 of the aircraft frame. Vertical wings 11 and 11a are also depicted in FIG. 5B. Both arc positioned on a longitudinal axis of aircraft 10, Item 15 is a cockpit.

Wings 42, when traversing bottom horizontal parts 20, 24 in said leading to trailing direction, are disposed in a common horizontal plane. Accordingly, continuous wings trap air between them in a plurality of air pockets, each air rocket being defined by a trailing edge of a leading wing and a leading edge of a contiguous trailing wing.

Bypass part 50, depicted in FIGS. 1, 5A, 5B, 10, 11, and 12, is disposed in fluid communication with the bottom horizontal parts 20, 24 of the airframe so that air under compression in the air pockets escapes into an ambient environment.

Figure 7A:
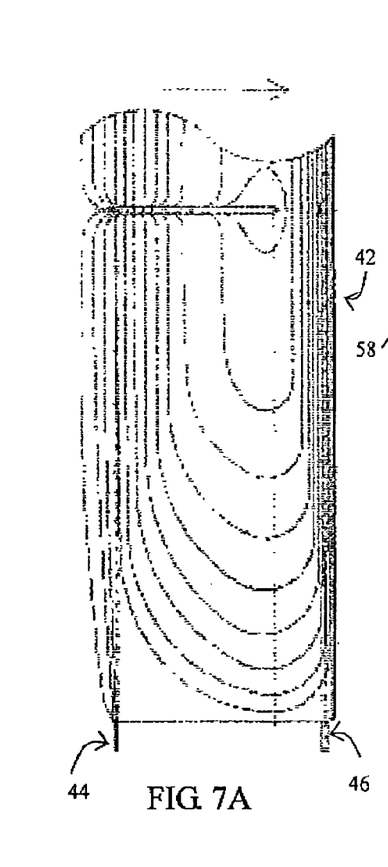
FIG. 7A is a plan view of slightly more than half of a wing of the novel aircraft.
Figure 7B:
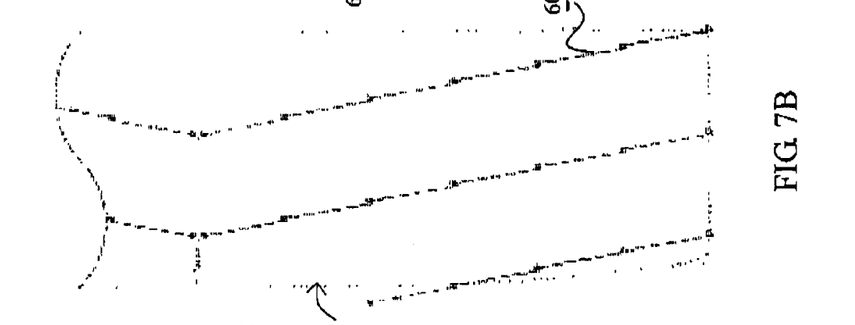
FIG. 7B is a plan view of an upper screen bulkhead plate.
Figure 7C:
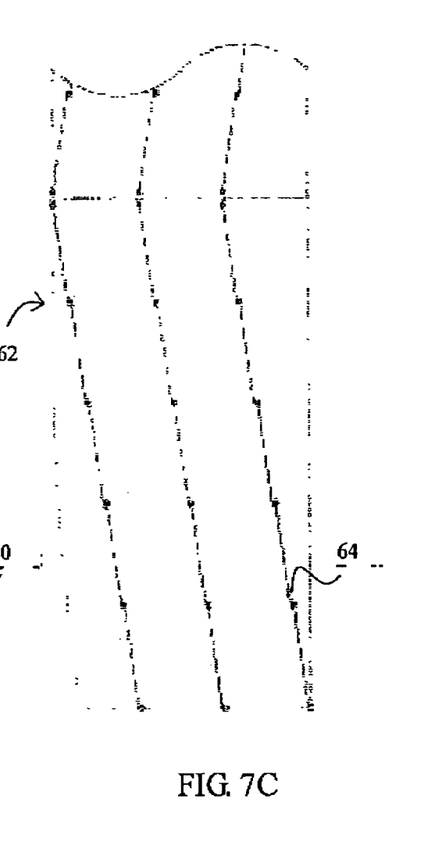
FIG. 7C is a plan view of a lower screen bulkhead plate.
Figure 9A:
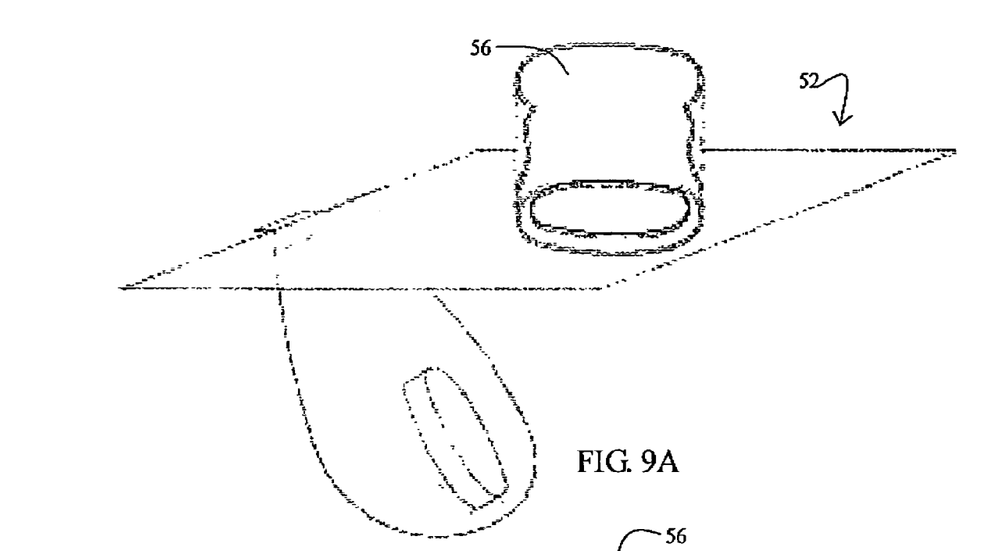
FIG. 9A is a perspective view of an ejection opening when in an open configuration.
Figure 9B:
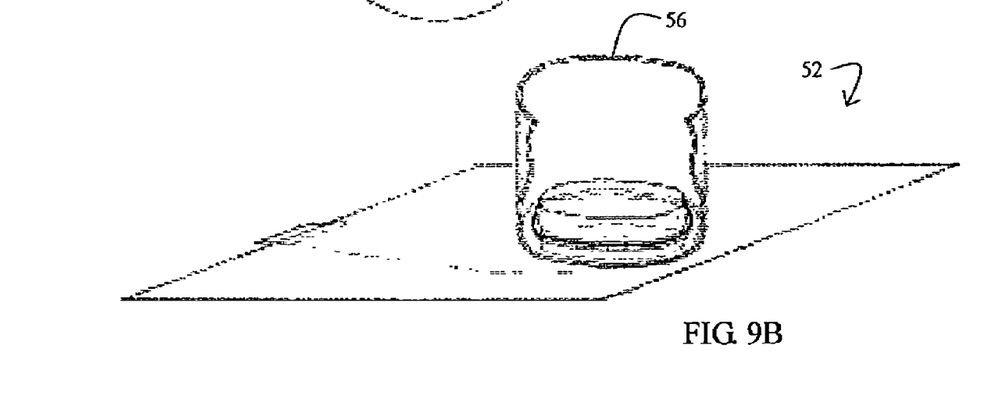
FIG. 9B is a perspective view of the ejection opening of FIG. 9A when in a closed configuration.

Bypass part 50 includes a plurality of ejection openings, collectively denoted 52 in FIG. 5A for releasing the compressed air. Items 54 are bulkhead walls for isolating each ejection opening from its contiguous ejection openings. The structure of each ejection opening 52 is better illustrated in FIGS. 9A and 9B. The ejection opening is hinged and releases air under pressure when open as depicted in FIG. 9A and is closed when in the FIG. 9B configuration. Item 56 is an upper intake for compressed air. It is cylindrical but drawn in a broken-open depiction to show how it is in open fluid communication with air rockets in bypass part 50, FIG. 7A depicts an upper screen bulkhead plate 58 having wind pressure control plate 60 and a lower screen bulkhead plate 62 having wind pressure control plate 64. These structures form a part of bypass part 50 and are adapted to disperse air from upper and lower surfaces of the wings, respectively.

Figure 10:
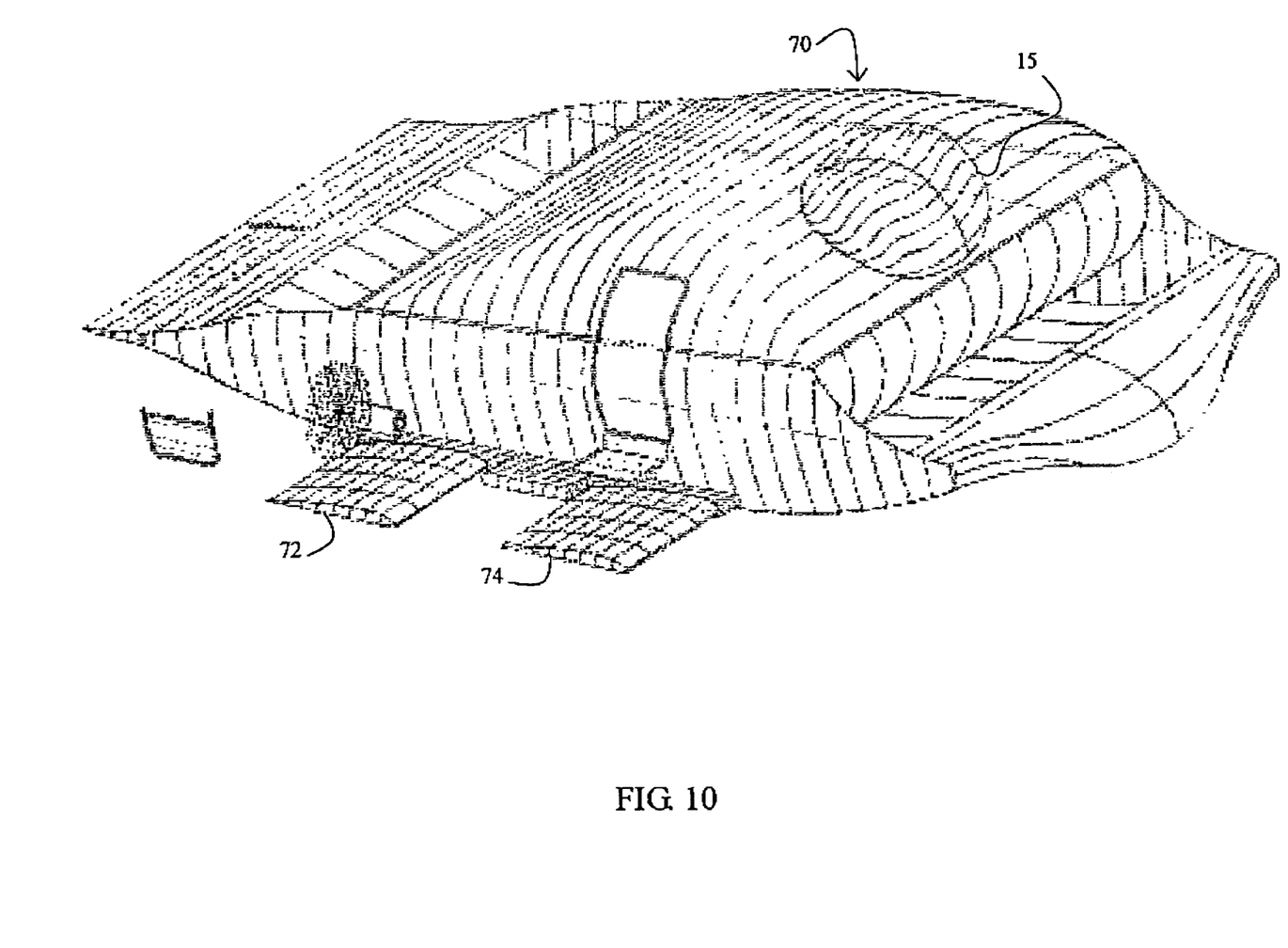
FIG. 10 is a perspective view depicting the novel aircraft with the aircraft frame and wings removed to better illustrate an outer watertight compartment and an inner accommodation compartment that are separated from one another.
Figure 11:
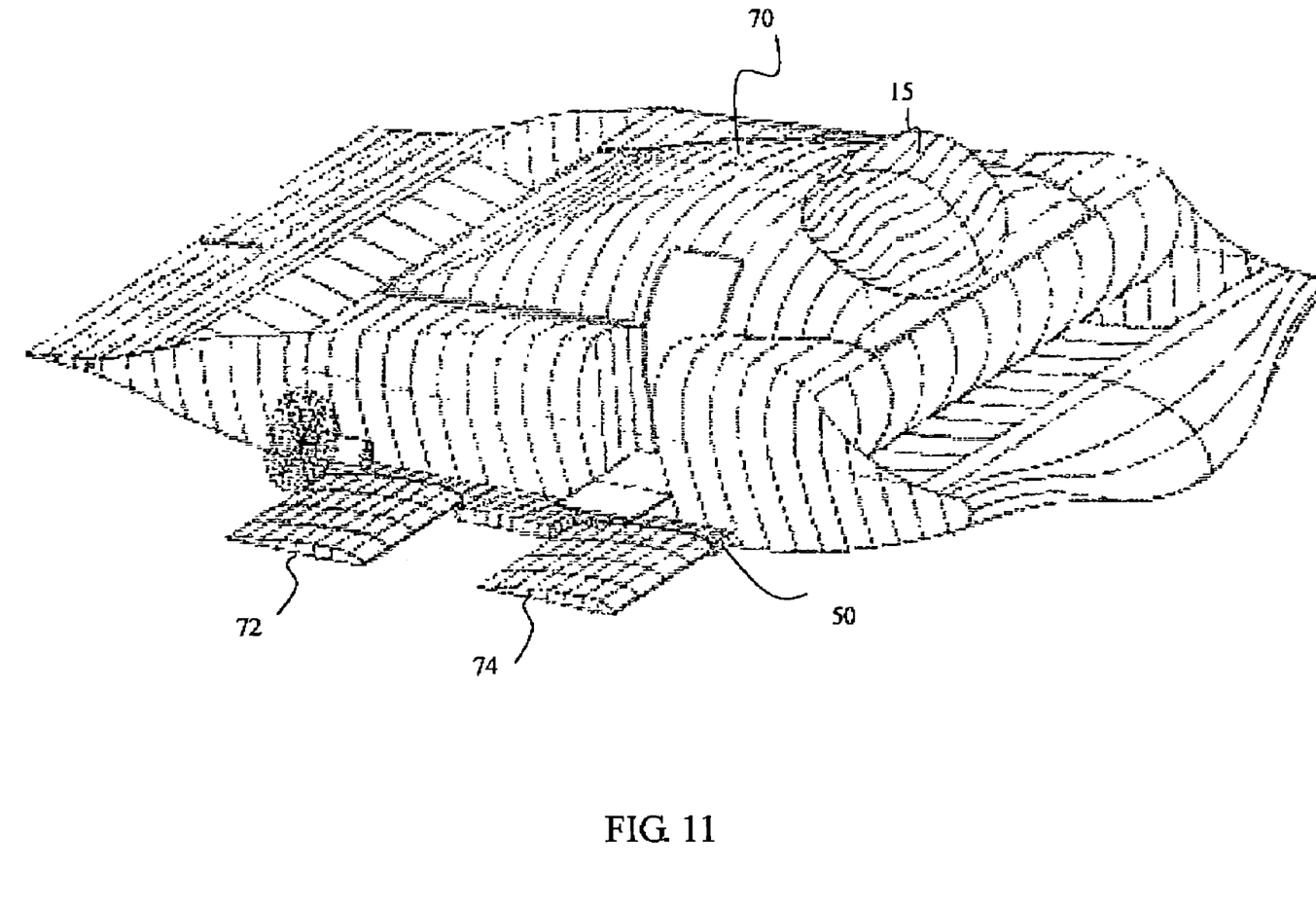
FIG. 11 is a perspective view like that of FIG. 10 but depicting an inner accommodation compartment that is reduced in size to accommodate a small group of travelers.

Passenger compartment 70, depicted in most of the figures, fits between side frames 14, 16 and is within the area defined by the loop-shaped path of travel. It is provided with suitable doors and windows as depicted and may include a platform as depicted in FIG. 10 for passenger convenience. The passenger compartment 70 in FIG. 11 is smaller than the passenger compartment of FIG. 10.

Figure 8A:
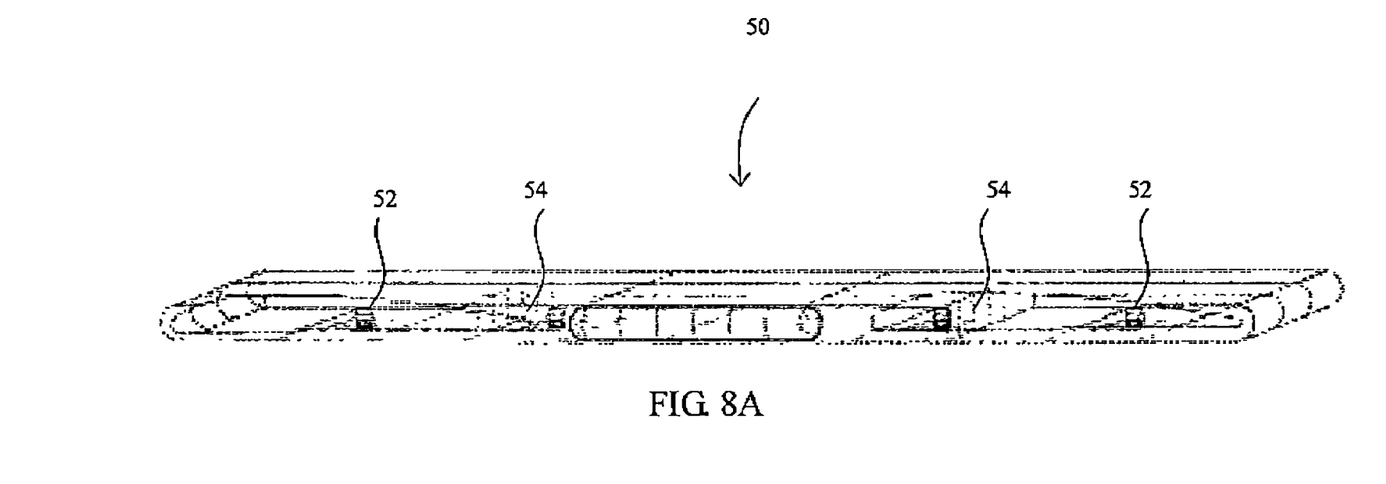
FIG. 8A is a perspective view of a bypass part that includes an ejection opening for compressed air.
Figure 8B:
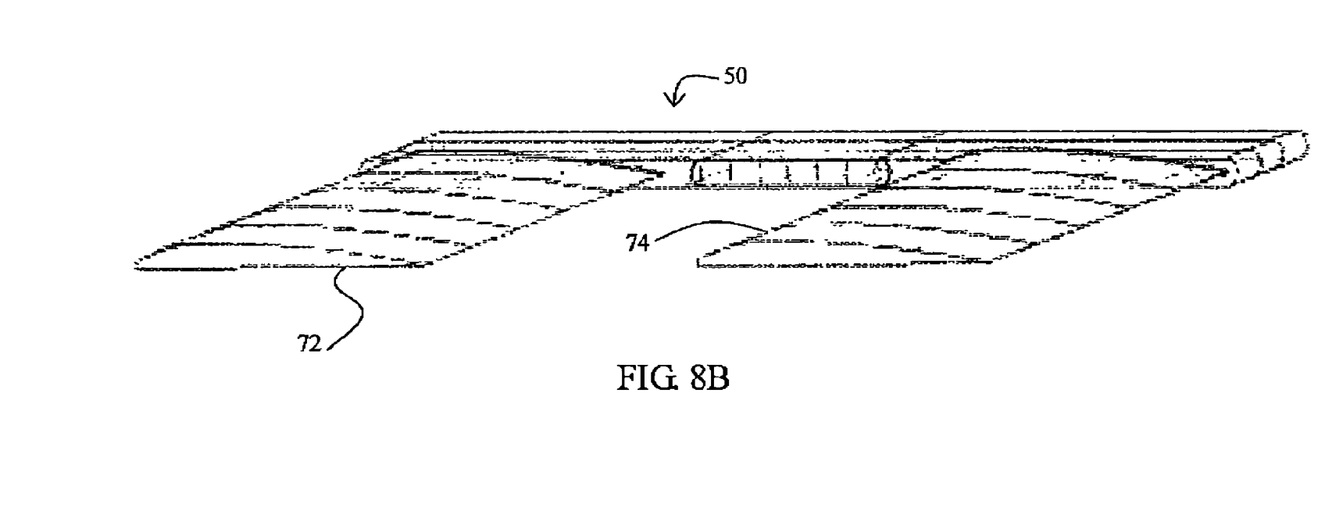
FIG. 8B is a perspective view like of the bypass part depicted in FIG. 8A, and further depicting a rearward and a forward fixed wing secured to said bypass part.

Fixed wings 72, 74, depicted in FIGS. 1, 8A, 8B, 10, 11, and 12, are secured to bypass part 50 as perhaps best understood in connection with FIG. 8B. Said fixed wings 72, 74 may be used in turning the aircraft, as depicted in FIG. 12 where fixed wine 74 is displaced from its non-turning position of repose. More particularly, in said FIG. 12, both bottom-mounted fixed wine 74 and lager, top-mounted fixed wine 13c are configured to cause the aircraft to roll to the left as drawn.

Figure 13A:
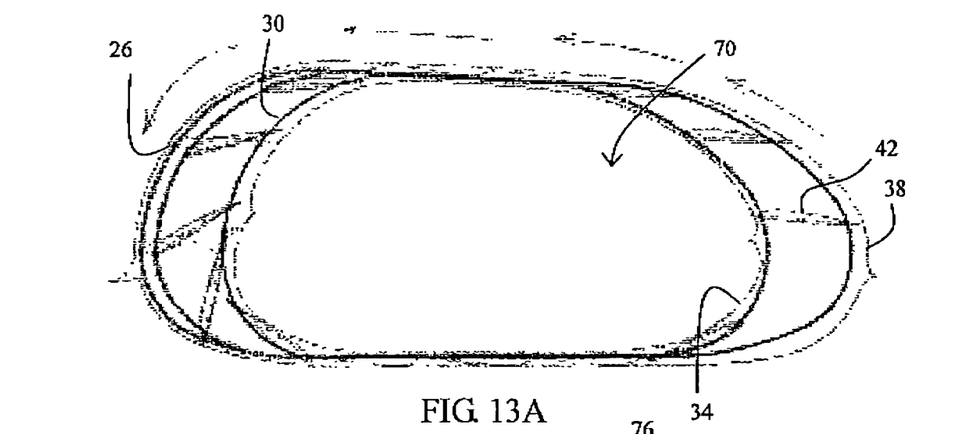
FIG. 13A is a side elevational view of the aircraft frame when the wings are mounted for folding as in FIG. 5B.
Figure 13B:
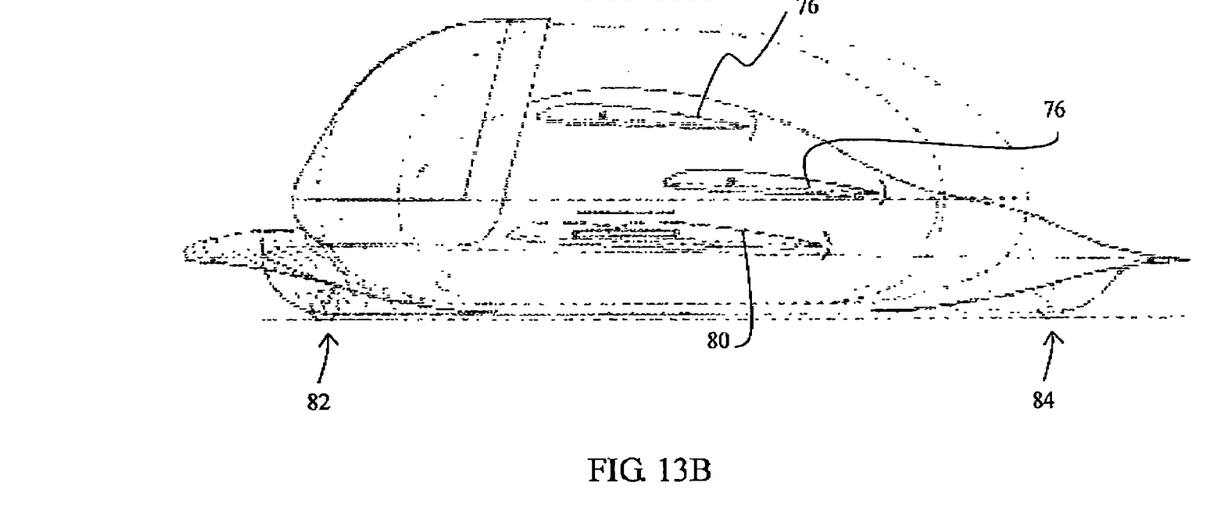
FIG. 13B is a side elevational view depicting intermediate fixed wings between a pair of aircraft coupled together as depicted in FIG. 2.

Wing 76 in FIG. 13B is a fixed wing coupled between side frames 14, 16 of airframe 12, wing 78 is a fixed wing for adjustment between said side frames, and wine 80 is a fixed wing for adjustment of weight balance. Reference numeral 82 in FIG. 13B indicates a front wheel and its wheel well and reference numeral 84 indicates a rear wheel and its wheel well.

What is claimed is:

1. A vertical take-off and landing aircraft, comprising:
an airframe body;
said airframe body including a first frame positioned on a first side of said aircraft, said first frame being longitudinally disposed and vertically-oriented;
said airframe body including a second frame positioned on a second side of said aircraft, said second frame being longitudinally disposed and vertically-oriented;
said first and second frames being parallel to one another and being transversely spaced apart from one another;
said first frame including a top horizontal part having a leading end and a trailing end, a bottom horizontal part having a leading end and a trailing end, a forward, leading arcuate part that interconnects respective leading ends of said top and bottom parts, a forward, trailing arcuate part that interconnects respective leading ends of said top and bottom parts, a rearward, leading arcuate part that interconnects respective trailing ends of said top and bottom parts, and a rearward, trailing arcuate part that interconnects respective trailing ends of said top and bottom parts;
said second frame including a top horizontal part having a leading end and a trailing end, a bottom horizontal part having a leading end and a trailing end, a forward, leading arcuate part that interconnects respective leading ends of said top and bottom parts, a forward, trailing arcuate part that interconnects respective leading ends of said top and bottom parts, a rearward, leading arcuate part that interconnects respective trailing ends of said top and bottom parts, and a rearward, trailing arcuate part that interconnects respective trailing ends of said top and bottom parts;
a plurality of wings disposed in interconnecting relation to said first and second frames, each wing being transversely disposed relative to a longitudinal axis of said aircraft and each wing having a first end movably connected to said first frame and a second, transversely opposed second end movably connected to said second frame;

each wing having a leading end movably connected at its opposite ends to said first and second frames;

each wing having a trailing end movably connected at its opposite ends to said first and second frames;

said leading end of each wing following a loop-shaped path of travel that includes traversing said respective top horizontal parts of said first and second frames from a trailing end to a leading end, traversing said respective forward, leading arcuate parts of said first and second frames from said respective leading ends of said respective horizontal top parts to said respective leading ends of said respective horizontal bottom parts, traversing said respective horizontal bottom parts from said respective leading ends to said respective trailing ends, and traversing said respective, rearward leading arcuate parts from said respective trailing ends of said respective bottom horizontal parts to said respective trailing ends of said respective top horizontal parts to complete one rotation; and said trailing end of each wing following a loop-shaped path of travel that includes traversing said respective top horizontal parts from their respective trailing ends to respective leading ends thereof, traversing said respective forward, trailing arcuate parts from said respective leading ends of said respective horizontal top parts to said respective leading ends of said respective bottom horizontal parts, traversing said respective bottom horizontal parts from their respective leading ends to their respective trailing ends, and traversing said respective rearward, leading arcuate parts from the respective trailing ends of said bottom horizontal parts to respective trailing ends of said top horizontal parts to complete one rotation.

2. The vertical take-off and landing aircraft of claim 1, further comprising:

said wings, when traversing said bottom horizontal parts in said leading to trailing direction, being disposed in a common horizontal plane and trapping air in a plurality of air pockets, each air pocket being defined by a trailing edge of a leading wing and a leading edge of a contiguous trailing wing;

a bypass part in fluid communication with respective bottom horizontal parts of said airframe;

whereby air under compression in said air pockets escapes into an ambient environment.

3. The vertical take-off and landing aircraft of claim 2, further comprising:

an ejection opening for releasing compressed air formed in said bypass part.

4. The vertical take-off and landing aircraft claim 2, further comprising:

an upper screen bulkhead plate having a wind pressure control plate and a lower screen bulkhead plate having a wind pressure control plate being formed in said bypass part, respectively;

said upper and lower screen bulkhead plates adapted to disperse air from upper and lower surfaces of said wings.

\* \* \* \* \*